(12) United States Patent
Adli

(10) Patent No.: US 6,876,740 B1
(45) Date of Patent: Apr. 5, 2005

(54) METHOD FOR TRANSMITTING INFORMATION BETWEEN A SWITCHING CENTER AND A COMMUNICATIONS TERMINAL

(75) Inventor: Wahid Adli, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/937,917

(22) PCT Filed: Mar. 27, 2000

(86) PCT No.: PCT/DE00/00931

§ 371 (c)(1),
(2), (4) Date: Jan. 15, 2002

(87) PCT Pub. No.: WO00/60879

PCT Pub. Date: Oct. 12, 2000

(30) Foreign Application Priority Data

Mar. 31, 1999 (DE) .......................................... 199 14 795
Mar. 3, 2000 (DE) .......................................... 100 10 495

(51) Int. Cl.$^7$ ............................................. H04M 3/00
(52) U.S. Cl. ............................ 379/265.04; 379/265.09; 379/266.09
(58) Field of Search ................................ 379/229, 230, 379/265.02, 265.03, 265.04, 265.05, 265.09, 266.09

(56) References Cited

U.S. PATENT DOCUMENTS

| | | | |
|---|---|---|---|
| 4,406,925 A | | 9/1983 | Jordan et al. |
| 5,012,512 A | | 4/1991 | Basso et al. |
| 5,392,345 A | * | 2/1995 | Otto ....................... 379/266.09 |
| 5,459,780 A | * | 10/1995 | Sand ...................... 379/266.09 |
| 5,712,907 A | | 1/1998 | Wegner et al. |
| 6,049,602 A | * | 4/2000 | Foladare et al. ....... 379/265.04 |
| 6,130,935 A | * | 10/2000 | Shaffer et al. ......... 379/127.03 |
| 6,175,564 B1 | * | 1/2001 | Miloslavsky et al. ....... 370/352 |
| 6,366,667 B1 | * | 4/2002 | Palacios et al. ........ 379/266.02 |

FOREIGN PATENT DOCUMENTS

| | | |
|---|---|---|
| GB | 2 327 172 | 1/1999 |
| WO | WO 96/42163 | 12/1996 |
| WO | WO 97/50226 | 12/1997 |

OTHER PUBLICATIONS

Global corporate networking with ISDN.
XP 002089234 Die Aufgabe der Kommunikationsnetze.

* cited by examiner

Primary Examiner—Bing Q. Bui
(74) Attorney, Agent, or Firm—Bell Boyd & Lloyd LLC

(57) ABSTRACT

A method and a telecommunications network for transmitting data to subscribers of an operator service, in which, after a subscriber logs on to a remote master office, a request is transmitted from his/her coordination processor to a virtual operator in order to initiate a dialing process to the subscriber, a link setup to the subscriber is carried out via a voice channel, the data to be transmitted is then loaded in the master office from the coordination processor into a group processor, a data transmission link in the master office is set up to a peripheral line trunk group for fast data links, and the data to be transmitted is then transmitted via a data link to the switching office of the subscriber and from here to the subscriber.

12 Claims, 1 Drawing Sheet

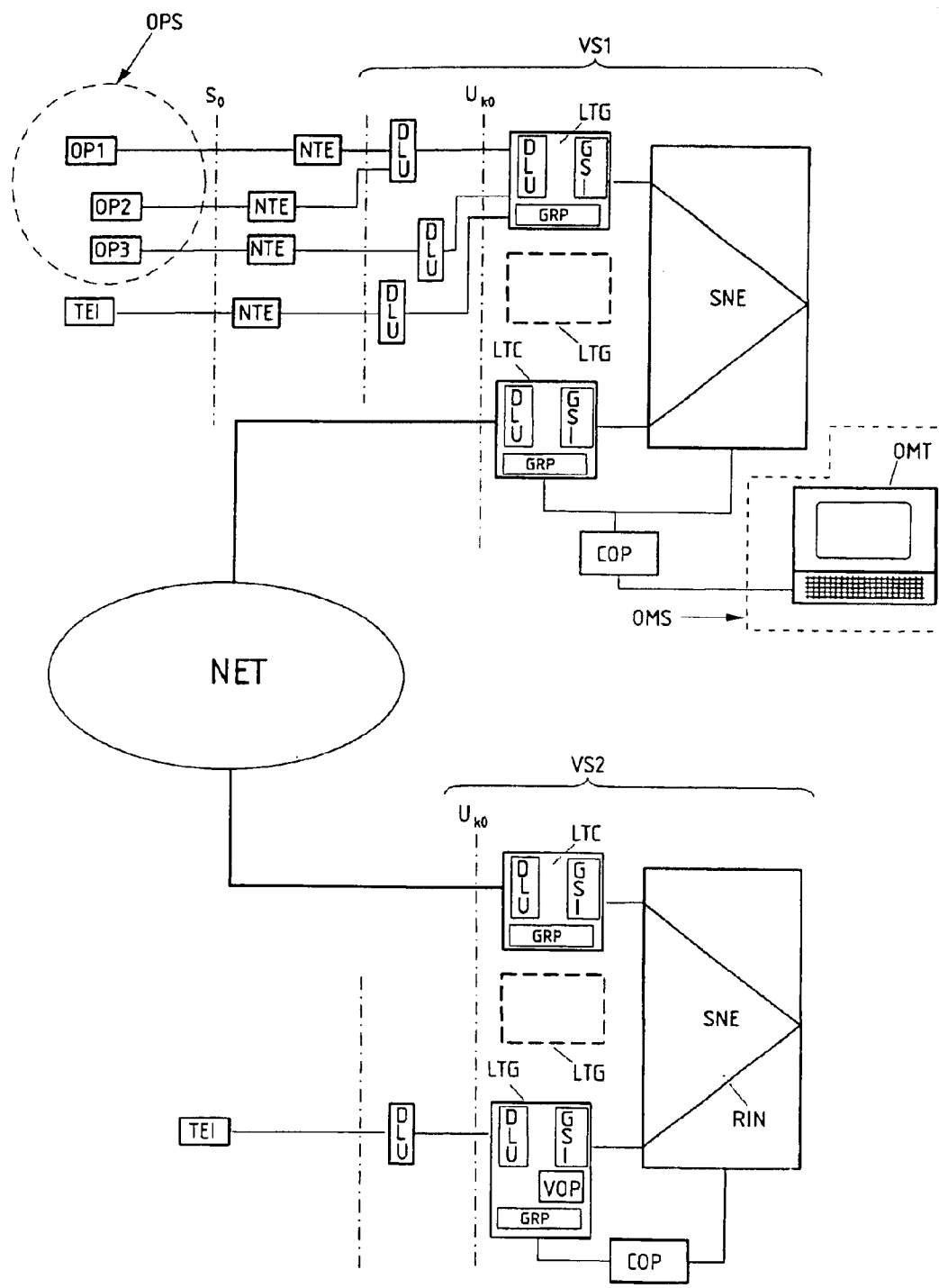

METHOD FOR TRANSMITTING INFORMATION BETWEEN A SWITCHING CENTER AND A COMMUNICATIONS TERMINAL

BACKGROUND OF THE INVENTION

The present invention relates to a method for transmitting data to operators of a telecommunications network which are members of an operator service, the data being specifically for the operator service, and at least one data channel and at least one call channel being available for each link.

The present invention also relates to a telecommunications network having a number of switching offices, in which telecommunications network operators which are members of an operator service are connected to at least one switching office, and each switching office has at least one coordination processor and peripheral line trunk groups with a group processor for the subscribers.

What are referred to as operator services which constitute an essential link between the customers of the network and the network operators are required in telephone networks. Such an operator service has diverse functions, one main function being to distribute information to subscribers on request. For example, a subscriber may call an operator service in an ISDN network and request information. The respective operator can then, if necessary, access a database, for example, in which case information relating to another subscriber is then provided to him/her on the screen of a PC. After a connection request by the operator, which can be effected, for example, by pressing a push-button key, the operator is connected to the searched-for subscriber. The operator is then connected back to the originating subscriber and to the searched-for subscriber and can optionally speak to one of the subscribers. Signaling on the D channel then takes place again at the push of a further push-button key, and the connection situations of the two subscribers of the peripheral line trunk group are indicated, and the call channels are connected via the switching matrix so that ultimately there is a direct link between the two subscribers. The example described here is intended to represent just one of the possibilities or functions of an operator service.

Larger networks with a larger number of subscribers require a correspondingly large number of operator service systems with a large number of usually hierarchically structured system subscribers (operators), such as, for example, in the case of the Applicant's system which is called ADMOSS. Messages from the operators to a switching office are sent, as already mentioned, in the D channel in an ISDN network, specifically in a point-to-point configuration with a permanently active layer 2 of the OSI layer model. The messages are transmitted in an ISDN network with the support of the D channel protocol, for which reason reference is also made to the Blue Book, Volume VI-Fascicle VI. 11, "Digital Subscribe Signalling System No. 1 (DSS1), Network Layer, User-Network Management", Recommendations Q. 930–Q. 940, in particular to Recommendation Q. 931.

The operators are usually located in what are referred to as call centers, and a respective device, composed of a terminal, PC, screen etc., and referred to below as "console" is directly connected to the system and/or can be connected to the local switching office. However, the need to use decentralized operators, for example within the context of homeworkers, is being increasingly felt, but a single central management system for the operators in the network should still be possible.

The PC of each operator has software installed which is suitable for the operator service, but when the operator logs. on, i.e. the console is respectively first put into operation, data from the carrier is also required. In such a case, the operator logs on by inputting his/her password and ID numbers and specific data is then loaded onto the console ("downloading") by the carrier, this data being, for example, the system clock times and data, the hierarchy structure, personal data and different rights, for example access possibilities to statistical data etc. If the operator is a supervisor, i.e. a high-ranking member in the hierarchy, he/she will also obtain access to tables which provide information on the working status of other operators etc.

U.S. Pat. No. 5,469,504 describes a call distributor system having a host computer together with a database which is physically connected to all the switching offices, and serves as a system for switching and/or conveying the data between the individual switching offices to which operators of an operator service are connected. In this system, a call link is firstly offered to an operator via the local switching office and, if the operator is not suitably located for this call, this call is transferred to a further operator using the host computer, this transfer being made using a special protocol, referred to in the document as "intertandem protocol". This protocol uses a DTMF method. The expenditure incurred as a result of the use of the host computer in conjunction with the X.25 interface protocol described in the document and the intertandem protocol is, however, to be considered as disadvantageous.

One object of the present invention is to disclose a method which permits the aforesaid specific information, which will be available in a centrally stored form, to be loaded to operator consoles which may be situated at any desired location in a network, without complex changes to existing systems being required.

SUMMARY OF THE INVENTION

This object is achieved with a method in which, according to the present invention, after an operator logs on to a remote master office in which the specific data for the operator service are present centrally, a request is transmitted by the coordination processor of the master office to a virtual operator set up in a peripheral line trunk group in order to initiate a dialing process to the operator, after which a link setup to the subscriber is carried out via a call channel and a corresponding message is transmitted to the coordination processor. The data to be transmitted are then loaded in the master office from the coordination processor into a group processor, a data transmission link in the master office is set up starting from this group processor to a peripheral line trunk group for fast data links, and the data to be transmitted is then transmitted via a data link to a peripheral line trunk group for fast data links between the switching office of the operator and from there, within the switching office, to the peripheral line trunk group (LTG) of the operator. Finally, the data to be transmitted is transmitted from this peripheral line trunk group to the operator.

Pursuant to the present invention, operators which are also connected to different switching offices of a communications network can receive specific, centrally managed data, this loading of data not necessarily having to be restricted to the initialization phase when logging on is performed.

It is expedient if the data to be transmitted is transmitted from the peripheral line trunk group to the operator via a data channel, this constituting the customary possibility for the data transmission, which also should be provided in the network in accordance with regulations.

However, because, a call connection is set up according to the present invention, it also may be appropriate if the data to be transmitted is transmitted via the set-up call channel using a data link program.

In order to take into account the dynamics and the resources of the group processor of the master office, an indication is given if the data from the coordination processor of the master office is loaded into the group processor in blocks of limited size via an existing data link interface.

The present invention is particularly suitable for applications in an ISDN network, the data channel being the D channel, and the call channels being B channels. In this case, the inter-office signaling system is advantageously an ISUP signaling system.

The aforementioned object of the present invention is also achieved with a telecommunications network in which, according to the present invention, a virtual operator is set up in a peripheral line trunk group of a switching office serving as master office, and is provided for transmitting data from the coordination processor of the master office to an operator of the operator service. The coordination processor of the master office is configured to transmit a request to the virtual operator, and to initiate a dialing process to the operator so that the data to be transmitted can be transmitted, after setting up of a data transmission link within the master office, via a peripheral line trunk group for fast data links of the master office to such a line trunk group of the switching office of the operator and can be transmitted from this switching office to the operator.

Additional features and advantages of the present invention are described in, and will be apparent from, the following Detailed Description of the Invention and the Figures.

BRIEF DESCRIPTION OF THE FIGURES

FIG. 1 shows the basic structure of a network with two switching offices and an operator service.

DETAILED DESCRIPTION OF THE INVENTION

At the top left of the FIGURE there are a number of operators OP1, OP2 . . . of an operator service OPS, details of the hierarchy within the operators OP1, OP2 . . . not being given here. All operators OP1, OP2 . . . are next to customary network operators TEI of a telecommunications network NET, of an ISDN network in the present case, and are therefore connected into the network via an So interface; i.e., each connected here to a network terminal NTE.

A first switching office VS1 of the network is shown top right and it has, in a manner known per se, a switching matrix SNE and periphery line trunk groups LTG, LTC connected thereto. A coordination processor COP is provided for controlling the switching office VS1, especially the switching matrix SNE. Each peripheral line trunk group LTG, LTC also contains, in a known manner, a group processor GRP. In this exemplary embodiment concentrators DLU (Digital Line Unit) are connected to each peripheral line trunk group via a UkO interface. Each of these concentrators DLU also has a number of inputs for the network terminals already mentioned above. In the case of relatively large switching offices, up to 512 peripheral line trunk groups LTG, LTC can be connected to a switching matrix SNE, and usually two concentrators DLU are connected to each line trunk group LTG. The peripheral line trunk groups LTG, LTC each also contain, in a known manner, what is referred to as a group switch GSI.

In a peripheral line trunk group LTG, LTC, various programs are executed which are supported by the group processor GRP; for example the greater part of the connection setup, the signaling, the code reception etc., takes place here. In general, 70% of the connection setup is carried out in the peripheral line trunk groups, whereas especially routing functions are assigned to the coordination processor COP.

The switching office also includes an operation and maintenance system OMS with an operation and maintenance terminal OMT at which monitoring personnel can continuously monitor the state of the switching office and detect faults.

The operators OP1, OP2 . . . of the operator service OPS usually have workstations with personal computers which contain ISDN cards and special software as well as headsets for the operators. The operators OP1, OP2, . . . can transmit messages to the switching office, especially to the peripheral line trunk groups LTG, these messages being processed in the group processor GRP and devised to corresponding further measures; for example, a connection setup. The messages are transmitted in a point-to-point configuration with a permanently active layer 2 and in the D channel in an ISDN network.

Bottom right in the drawing there is a further switching office VS2 which is associated with the network NET and whose setup corresponds basically to the first switching office VS1, but the second switching office VS2 serves as a master office above the operator service. Of course, a large number of other switching offices (not shown here) also may be provided as a function of the size of the network.

Each switching office VS1, VS2 has a particular peripheral line trunk group LTC for fast data links which permit data exchange, within the scope of inter-office signaling; for example, in the ISUP signaling system (see, for example, P. Bocker, ISDN-Digitale Netze fur Sprach-, Text-, Daten-, Video- und Multimediakommunikation [Digital Networks for Call, Text, Data, Video and Multimedia Communication], 4th Edition, Springer [Publishing house], Section 6.2.9, "Zwischenamtsignalisierung" [Inter-office signaling]), with other such line trunk groups via rapid data links, for example optical fiber lines.

In the present case, that data which is to be loaded into the consoles of the operators OP1, OP2, . . . may be in the remote office, i.e. the switching office VS2, namely in its coordination processor COP. In order to transmit the aforesaid data which is specifically for the operator service and which is composed, for example, of tables for the function of the console, to the operator OP1, the present invention provides a method described in more detail below.

Firstly, the operator OP1 logs on with a password and an ID number to the remote switching office VS2, the master office, which is, however, not a subject of the present invention. In principle, after the operator OP1 logs on to the remote switching office VS2, the coordination processor COP of the master office VS2 transmits a request to a virtual operator VOP to initiate a dialing process to the operator OP1. Such a virtual operator, which is set up in a peripheral line trunk group LTG, is required by the coordination processor COP in order to be able to set up a call link. In fact, a connection setup is then carried out starting from the virtual operator VOP, to the operator OP1 via a call channel, here a B channel, and after the successful connection setup the coordination processor COP is also informed of the call status and also informed in the event of a disconnection of the link.

The corresponding program part then initiates, given a successful setup of a link, a data link connection from a PC or the like to the coordination processor, a corresponding identification of this new type of link, which also can be referred to as a "remote downloading" link, being used. The data is then loaded, for example, in blocks of four kbytes into a group processor GRP by the coordination processor via the existing data link interface. A data transmission link RIN (Report Interface) in the master office VS2 is then set up starting from this group processor GRP to a peripheral line trunk group LTC. This line trunk group LTC is used for fast data links to other offices, the data to be transmitted then being transmitted via a fast data link, for example an optical fiber cable, to a corresponding peripheral line trunk group LTC of the switching office VS1 of the subscriber OP1, from here within the switching office VS1 to the peripheral line trunk group LTG of the subscriber. Finally, the data to be transmitted are transmitted from this peripheral line trunk group LTG to the operator OP1 and loaded there. The transmission from the peripheral line trunk group LTG of the operator OP1 to the latter is made via a D channel in which a data link to the console is set up. However, it is also possible to load the further data into the console via a B channel link, for which purpose a corresponding data transmission protocol has to be employed for using the B channel as a data transport medium. After all the data has been transmitted, the data link connection is released and finally the existing call between the operator OP1 and the vertical operator is also released from the console.

It is to be noted that the loading of data does not necessarily have to have its starting point in a request of the operator OP1, but a link from the master office to the operator OP1 can instead also be made at the request of the operator service using the virtual operator VOP. Of course, all this presumes that the call numbers of the corresponding operators OP1, OP2, . . . are known to the master office VS2. In this context, it is necessary to set up a call for addressing purposes, and the data can then, as already mentioned, be transmitted either over the D channel at 16 kbit/s in the case of ISDN or even over a B channel with an even higher speed; namely, 64 kbit/s.in the case of ISDN. The present invention therefore permits a significant expansion of an operator service because the latter can be integrated into a large network with a multiplicity of switching offices (only two are shown in the drawing for the sake of simplification), and nevertheless centralized and clearly organized management is possible. The data loaded into the console also makes it possible to take into account the hierarchy in the operator service which is mentioned at the start, so that higher-ranking operators can receive preferred data which is not to be made available to all operators.

Although the present invention has been described with reference to specific embodiments, those of skill in the art will recognize that changes may be made thereto without departing from the spirit and scope of the invention as set forth in the hereafter appended claims.

What is claimed is:

1. A method for transmitting data to operators of a telecommunications network, the operators being members of an operator service, the data for the operator service being specific, and at least one data channel and at least one called channel being available for each link, the method comprising the steps of:
   logging onto a remote master office, by an operator, in which the specific data for the operator service is centrally present;
   transmitting a request by a coordination processor of the master office to a virtual operator set up in a peripheral line trunk group in order to initiate a dialing process to the operator;
   setting up a link to the operator via a call channel;
   transmitting a corresponding message to the coordination processor;
   loading the data to be transmitted in the master office from the coordination processor into a group processor;
   setting up a data transmission link in the master office starting from the group processor to a peripheral line trunk group for fast data links;
   transmitting the data to be transmitted via a data link to the peripheral line trunk group for fast data links of the switching office of the subscriber;
   transmitting the data from the peripheral line trunk group for fast data links, within the switching office, to a peripheral line trunk group of the operator; and
   transmitting the data from the peripheral line trunk group of the operator to the operator.

2. A method for transmitting data to operators of a telecommunications network as claimed in claim 1, wherein the data to be transmitted is transmitted from the peripheral line trunk group of the operator to the operator via a data channel other than the call channel.

3. A method for transmitting data to operators of a telecommunications network as claimed in claim 1, wherein the data to be transmitted is transmitted via a set up call channel using a data-link program.

4. A method for transmitting data to operators of a telecommunications network as claimed in claim 1, the method further comprising the step of:
   loading the data from the coordination processor of the master office into the group processor in blocks of limited size via an existing data-link interface.

5. A method for transmitting data to operators of a telecommunications network as claimed in claim 1, wherein the communications network is an ISDN network, the data channel is a D channel and the call channels are B channels.

6. A method for transmitting data to operators of a telecommunications network as claimed in claim 4, wherein an ISUP signaling system is provided for inter-office signaling.

7. A telecommunications network, comprising:
   a plurality of switching offices in which operators, which are members of an operator service, are connected to at least one switching office, and each switching office having at least one coordination processor and peripheral line trunk groups with a group processor for subscribers; and
   a virtual operator set up in a peripheral line trunk group of a switching office serving as a master office, provided for transmitting data from the coordination processor of the master office to an operator of the operator service, the coordination processor of the master office being configured to transmit a request to the virtual operator and to initiate a dialing process to the operator so that the data to be transmitted can be transmitted, after setting up of a data transmission link within the master office, via a peripheral line trunk group for fast data links of the master office to a line trunk group of the switching office of the operator and can be transmitted from this switching office to the operator.

8. A telecommunications network as claimed in claim 6, further comprising:
   a data channel other than the call channel for transmitting the data from the peripheral line trunk group to the operator.

9. A telecommunications network as claimed in claim 7, further comprising:
   a data link program for transmitting the data via the set up call channel.

10. A telecommunications network as claimed in claim 7, further comprising:

a data link interface for loading the data from the coordination processor of the master office in blocks.

11. A telecommunications network as claimed in claim 7, wherein the network is an ISDN network, the data channel is a D channel and the call channels are B channels.

12. A telecommunications network as claimed in claim 7, further comprising:

an ISUP signaling system for interoffice signaling.

* * * * *